(12) United States Patent
Payne

(10) Patent No.: US 12,301,090 B2
(45) Date of Patent: May 13, 2025

(54) HEAT EXCHANGER SYSTEM FOR ELECTRIC MOTOR

(71) Applicant: Schaeffler Technologies AG & Co. KG, Herzogenaurach (DE)

(72) Inventor: Matthew Payne, Glenmont, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 253 days.

(21) Appl. No.: 17/961,023

(22) Filed: Oct. 6, 2022

(65) Prior Publication Data

US 2023/0110040 A1 Apr. 13, 2023

Related U.S. Application Data

(60) Provisional application No. 63/253,783, filed on Oct. 8, 2021.

(51) Int. Cl.
*H02K 9/197* (2006.01)
*H02K 5/20* (2006.01)

(52) U.S. Cl.
CPC ............. *H02K 9/197* (2013.01); *H02K 5/203* (2021.01)

(58) Field of Classification Search
CPC ............................... H02K 9/197; H02K 5/203
See application file for complete search history.

(56) References Cited

U.S. PATENT DOCUMENTS

| | | | |
|---|---|---|---|
| 3,877,546 A | 4/1975 | Shrader | |
| 5,997,261 A | 12/1999 | Kershaw et al. | |
| 6,909,210 B1 * | 6/2005 | Bostwick | H02K 5/203 |
| | | | 310/58 |
| 2011/0084561 A1 | 4/2011 | Swales et al. | |
| 2014/0077635 A1 * | 3/2014 | Hossain | H02K 15/12 |
| | | | 310/64 |
| 2021/0273520 A1 | 9/2021 | Kim et al. | |
| 2022/0094223 A1 * | 3/2022 | Schwanemann | H02K 1/20 |

FOREIGN PATENT DOCUMENTS

| | | |
|---|---|---|
| JP | 2010-130794 A | 6/2010 |
| JP | 2021-168527 A | 10/2021 |
| JP | 2022-522211 A | 4/2022 |
| KR | 102003981 B1 | 7/2019 |
| KR | 10-2021-0081937 A | 7/2021 |
| WO | 2020017101 A1 | 1/2020 |
| WO | WO-2020216507 A1 * | 10/2020 ............. H02K 1/185 |

* cited by examiner

*Primary Examiner* — Forrest M Phillips
(74) *Attorney, Agent, or Firm* — Volpe Koenig

(57) ABSTRACT

A hybrid module is provided that includes a water jacket and an oil reservoir. The water jacket can be configured to both directly provide a heat exchanger feature for a stator as well as the oil reservoir. Oil within the oil reservoir can be configured to be sprayed towards the stator at the same time that the water jacket is cooling the stator. This configuration provides an improved cooling effect for the stator.

20 Claims, 4 Drawing Sheets

HEAT EXCHANGER SYSTEM FOR ELECTRIC MOTOR

CROSS-REFERENCE TO RELATED APPLICATION

This application claims priority to U.S. Provisional Application No. 63/253,783, which was filed on Oct. 8, 2021, and is incorporated herein by reference in its entirety.

FIELD OF INVENTION

The present disclosure generally relates to an electric motor (e-motor), and more specifically relates to a water and oil cooling arrangement for an e-motor.

BACKGROUND

Hybrid modules are generally known. There is a general need to cool various aspects of hybrid modules, such as the stator and stator windings, but there are various issues with implementing a heat exchanger assembly in hybrid modules due to various requirements. In particular, the packaging or installation space must be optimized in hybrid modules while also providing an efficient heat exchanger assembly. Providing a reliable cooling element for the fluids in heat exchanger systems can be difficult. Accordingly, it would be desirable to provide a compact and highly efficient heat exchanger assembly that can be integrated with an e-motor.

SUMMARY

As disclosed herein, example embodiments broadly comprise a hybrid module having a housing including an axially extending flow channel and a radially extending flow channel fluidly connected to one end of the axially extending flow channel. A module wall can extend radially inward from the housing and include a flow channel extending substantially in a radial direction, the flow channel being fluidly connected to the other end of the axially extending flow channel.

An e-motor may include a rotor and a stator fixed to the housing that is rotatable with respect to the rotor, the stator including stator windings and a stator carrier. A water jacket may be disposed around the stator, wherein oil is configured to be routed through the flow channel in the module wall through the axially and radially extending flow channels in the housing to spray on the stator windings for cooling therein.

In example embodiments disclosed herein, the hybrid module includes a reservoir disposed between the water jacket and the housing, wherein the oil is routed from the radially extending flow channel to the reservoir such that the oil is cooled by the water jacket. The housing may include a groove formed in an inner surface thereof and the stator carrier includes at least one opening, wherein the oil is arranged to flow from the reservoir through the groove and out the at least one opening onto the stator windings. The stator windings may be axially aligned with the at least one opening and the water jacket is formed or bounded by the stator carrier and an outer ring. The oil may be routed through the module wall and the housing via an oil pump, for example.

In another example, a hybrid module is provided that includes a water jacket configured to surround at least a first portion of a stator. The water jacket can be fluidly connected to a water jacket inlet. An oil reservoir can be arranged radially outwardly from the water jacket. The oil reservoir can be configured to spray oil towards the stator, such as via at least one opening. The water jacket can be configured to cool oil with in the oil reservoir and the stator.

An oil circuit can be provided that includes at least one pump. A fluid collection element can be configured to collect the oil after spraying the stator. The at least one pump can be configured to receive the oil from the fluid collection element. In this way, a closed oil circuit is provided that does not rely on oil from other sources, such as the engine. The oil flows in a closed circuit that is cooled via the water jacket.

A housing can be provided that includes an axially extending flow channel and a radially extending flow channel fluidly connected to a first end of the axially extending flow channel. A module wall can be arranged radially inward from the housing and define a flow channel fluidly connected to a second end of the axially extending flow channel. The oil can be configured to be routed from the flow channel in the module wall through the axially and radially extending flow channels in the housing to spray the stator.

The oil reservoir and the water jacket can be arranged coaxially with each other. In one example, a majority of the water jacket and a majority of the oil reservoir can overlap with each other.

A stator carrier can also be provided that defines the at least one opening configured to spray the oil.

The housing can include at least one groove formed on an inner surface thereof. The at least one groove can define a flow path for the oil to be supplied to the at least one opening.

The water jacket can include an interior pocket defined in radially outward direction by an outer ring, and defined in a radially inward direction by a stator carrier. The outer ring can define a radially inner boundary of the oil reservoir.

The at least one opening can be configured to be axially aligned with stator windings of the stator such that the oil is configured to spray the stator windings.

A method of cooling a stator for a motor assembly is also disclosed herein. The method can include arranging a water jacket directly adjacent to an outer surface of the stator, wherein the water jacket is configured to circulate water therein to cool the stator. The method can include arranging an oil reservoir directly adjacent to an outer surface of the water jacket. The method can include spraying oil from the oil reservoir towards the stator to further cool the stator.

A heat exchanger assembly is also disclosed herein. The heat exchanger assembly can comprise a water jacket configured to be in direct contact with a body of a stator, and the water jacket can be configured to circulate water from an inlet to an outlet. The water jacket can include an outer ring defining a radially outer wall of the water jacket. An oil reservoir can be partially bound by the outer ring and the oil reservoir can be configured to supply oil to at least one opening such that oil is sprayed towards stator windings.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Figure 1:
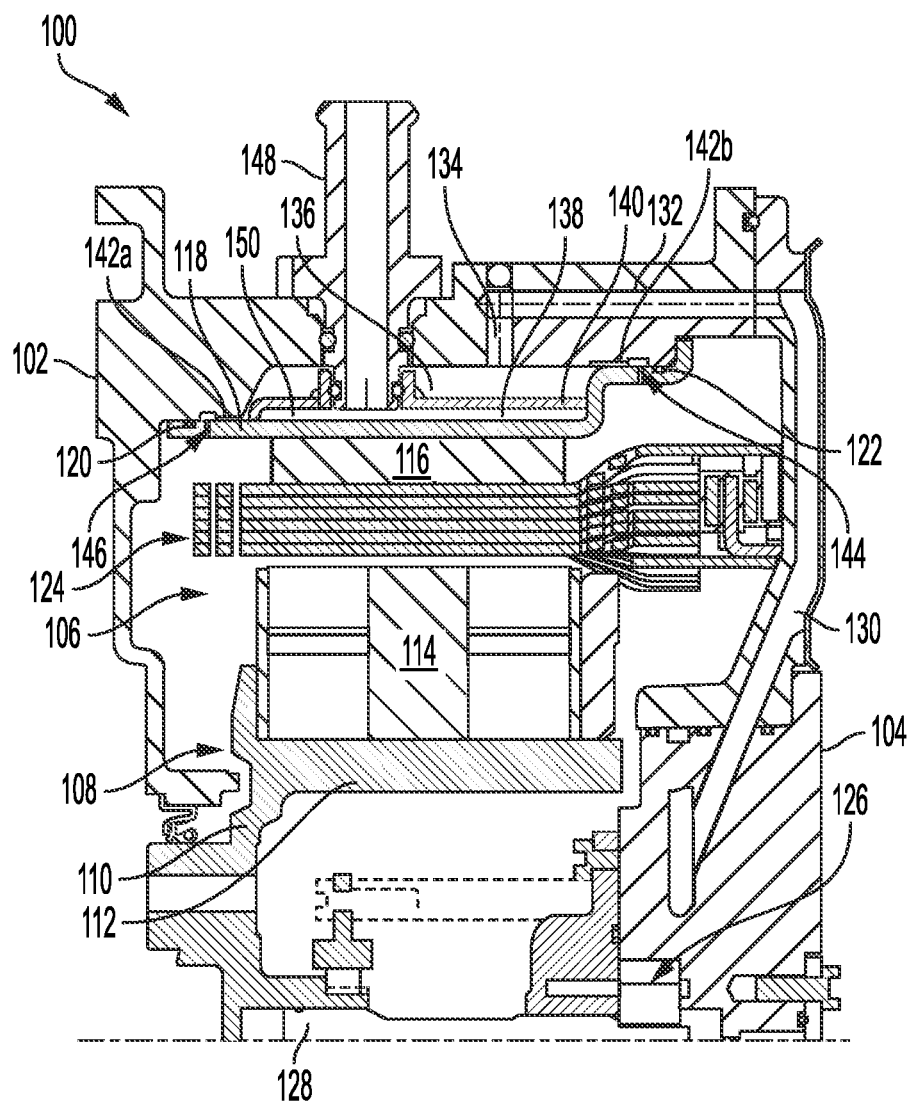
FIG. 1 illustrates a cross-sectional view of a hybrid module according to one example.

Certain terminology is used in the following description for convenience only and is not limiting. "Axially" refers to a direction along an axis (X) of an assembly. "Radially" refers to a direction inward and outward from the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

In some hybrid modules, it is necessary to cool the e-motor with both oil and water. In some cases, an external water-to-oil heat exchanger is mounted to the unit. However, in some applications, there is no space for a conventional box shaped cooler of this kind and other solutions are needed to provide the required cooling. Embodiments of this disclosure described herein provide a hybrid module that utilizes a water jacket to not only pull heat from the stator laminations, but also to pull heat from the oil. The heat exchange from oil to water is facilitated by creating a reservoir around the water jacket which oil is pumped into. Oil then exits the reservoir after being cooled via spray nozzles which spray directly on the windings. This configuration is particularly advantageous with respect to vehicle packaging. Embodiments according to this disclosure provide for oil and water cooling in compact or smaller envelopes or packaging, which can be conveniently incorporated into existing vehicle packages.

Figure 2:
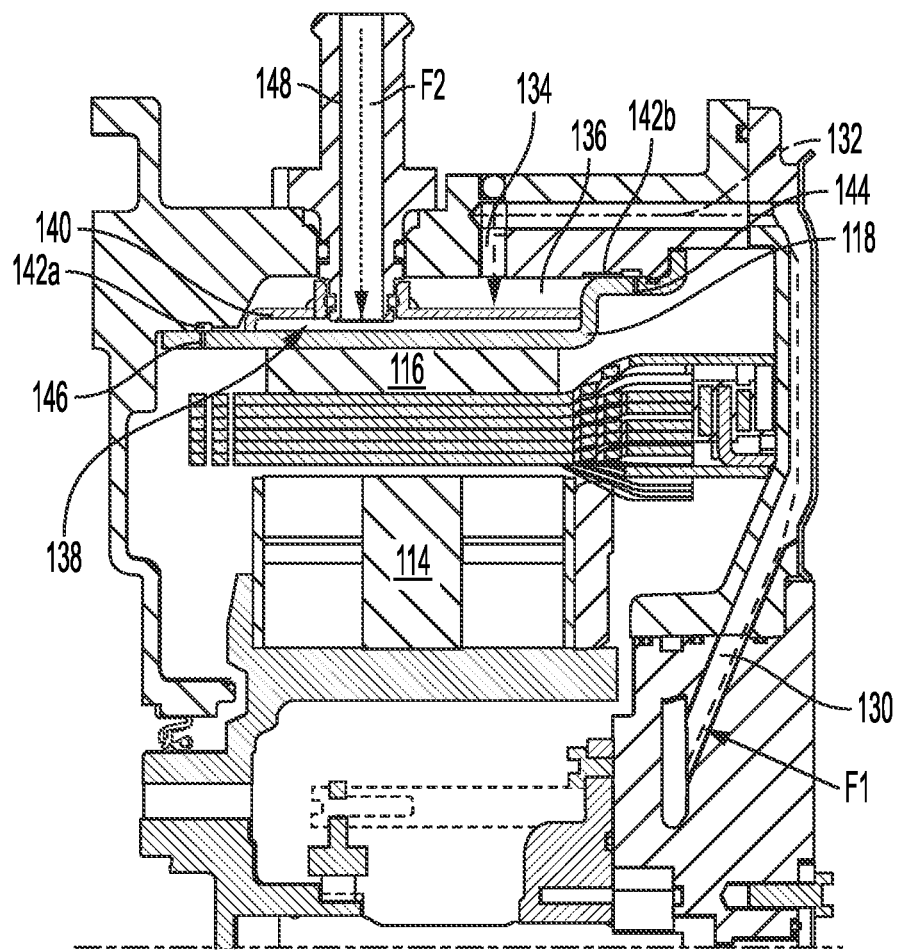
FIG. 2 illustrates a cross-sectional view of a cooling flow arrangement of the hybrid module of FIG. 1.
Figure 3:
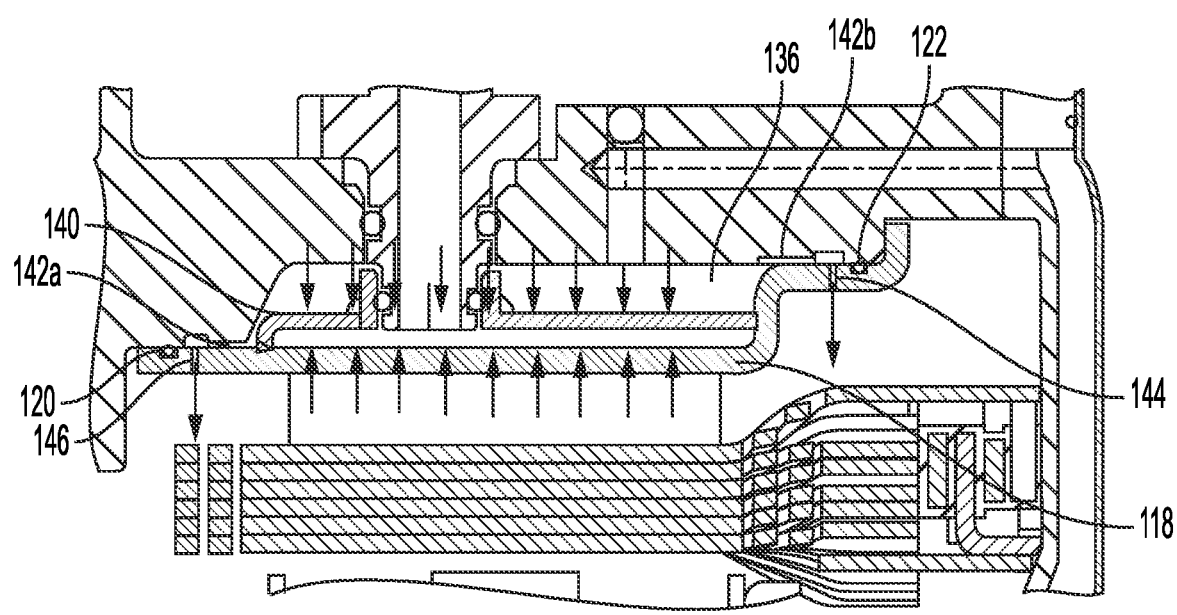
FIG. 3 shows magnified cross-sectional view of a portion of the hybrid module of FIG. 1.
Figure 4:
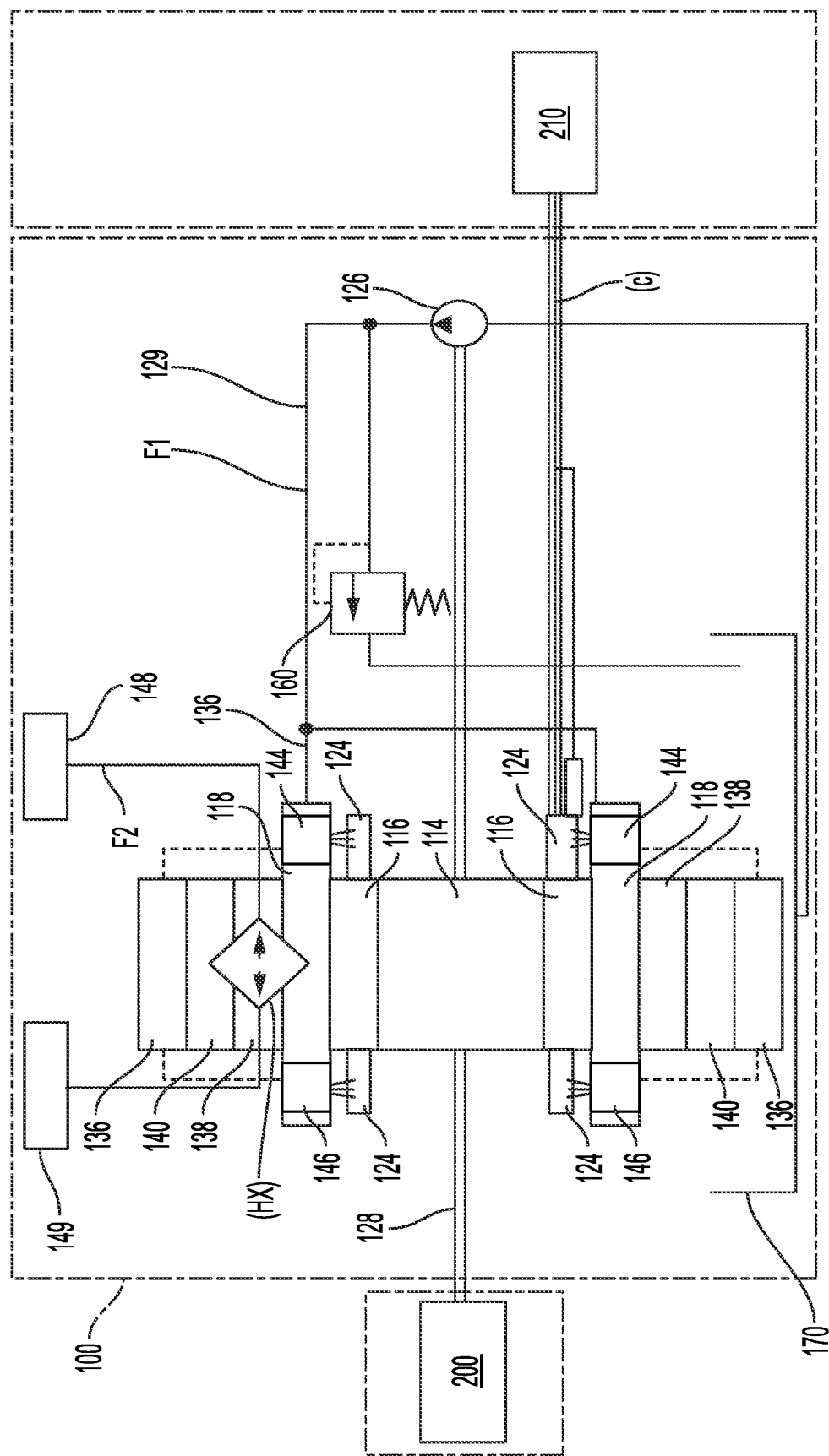
FIG. 4 illustrates a schematic arrangement of a hybrid system including the hybrid module of FIG. 1.

The following description is made with reference to FIGS. 1-4. FIG. 1 shows a cross-sectional view of a hybrid module 100 according to an example embodiment of the present disclosure. FIG. 2 shows a cooling flow arrangement of the hybrid module 100. FIG. 3 shows an enlarged view of a portion of the cooling flow arrangement for the hybrid module 100. FIG. 4 shows a hydraulic schematic arrangement of a hybrid system incorporating the hybrid module 100.

The hybrid module 100 can include a housing 102, a module wall 104, and e-motor 106 mounted on a rotor carrier 108 or rotor carrier hub. The rotor carrier 108 can include a flange 110 and an axially extending portion 112. The hybrid module 100 can be a crank mounted generator, in one example. An engine crank shaft or other shaft connected to an internal combustion engine 200 can be connected to the rotor carrier 108 for facilitating torque input. In one example, torque can be supplied to the system via shaft 128. In one example, oil is supplied to the hybrid module 100, such as via an oil circuit 129, which can be separate from an oil circuit for the internal combustion engine 200. Accordingly, the oil circuit 129 can be a self-contained cooling oil circuit that is closed to a remainder of the engine or vehicle circuits. Cooling for the oil within the oil circuit 129 can be provided solely via the water jacket 138, in one example.

The e-motor 106 can include a rotor 114 mounted on an outer surface of the axially extending portion 112 of the rotor carrier 108. One of ordinary skill in the art would understand that the rotor 114 can be mounted in different manners and configurations.

The e-motor 106 can further include a stator 116 and a stator carrier 118. The stator carrier 118 can be sealed relative to the housing 102 via at least one seal 120, 122, which can define axial ends of an oil reservoir 136 that is connected to oil circuit 129. The stator 116 can further includes stator windings 124. One of ordinary skill in the art would understand the stator 116 can include further components not specifically described herein.

The hybrid module 100 can include an oil pump 126, which may be a mechanical oil pump or other type of pump, that can be driven via a shaft 128. The shaft 128 can extend through the rotor carrier 108 to the oil pump 126. The oil pump 126 can be configured to pump or route oil from one portion, such as a bottom, of the hybrid module 100 such that the oil is directed to spray towards the stator 116. In one example, as shown in FIG. 4, the pump 126 is configured to be supplied oil from a fluid collection element 170 (i.e. a pan or sump). The fluid collection element 170 can also be configured to collect oil after the oil has sprayed the stator 116 and/or stator windings 124. The pump 126 is part of the oil circuit 129, in one example. A valve 160, such as a check valve, can be implemented in the oil circuit 129.

The oil can be directed up through an inlet flow channel 130 formed in the module wall 104 via flow path F1, as shown in FIG. 2. Flow path F1 can extend within the inlet flow channel 130 up the module wall 104 in a radially outward direction to an axially extending channel 132 and a radially extending channel 134 formed in the housing 102. The inlet flow channel 130 can fluidly connect with the axially extending channel 132, and the axially extending channel 132 can connected with the radially extending channel 134. The inlet flow channel 130, axially extending channel 132, radially extending channel 134, etc. can all form a portion of the oil circuit 129. While a specific configuration of various channels is illustrated, one of ordinary skill in the art would understand that other channels or configurations can be used to provide oil to the oil reservoir 136.

As shown in FIG. 2, another flow path F2 is illustrated for water being fed into the water jacket 138. FIG. 4 also illustrates the water flow path F2 as flowing between an inlet 148 and an outlet 149. The outlet 149 is not specifically illustrated in FIG. 2 and instead is shown schematically in FIG. 4.

In one example, the oil can be routed from the oil pump 126 through the inlet flow channel 130, to the axially extending channel 132 and finally to the radially extending channel 134 that opens into the oil reservoir 136. Once the oil is fed into the oil reservoir 136, the oil contained therein is configured to be cooled by the water jacket 138. The oil reservoir 136 can have various shapes or profiles. In one example, the oil reservoir 136 can be annular or ring shaped.

The water jacket 138 can be formed, defined, or bounded by the stator carrier 118 in a radially inward direction and an outer ring 140 in a radially outer direction. In one example, the water jacket 138 is configured to surround at least a first portion of a stator 116, i.e. a stator body. The water jacket 138 can be configured to cool both the stator 116 and the oil in oil reservoir 136. The water jacket 138 and the oil reservoir 136 can be coaxially arranged. A majority of the water jacket 138 and a majority of the oil reservoir 136 can overlap with each other, which provides an improved cooling effect for the oil in the oil reservoir 136. The amount of surface contact between the water jacket 138 and the oil reservoir 136 can be modified to increase or decrease the specific cooling ability that is required by a particular application.

The oil reservoir 136 can be in direct contact with an outer surface of the water jacket 138, i.e. the outer ring 140. In this manner, the outer ring 140 can act as a heat exchanger element in that the outer ring 140 transfers heat between the water jacket 138 and the oil reservoir 136. The water jacket 138 thereby serves a dual cooling function in which the water jacket 138 provides a cooling or heat exchanger effect with respect to at least one radially inner component (i.e. stator 116) and with respect to at least one radially outer component (i.e. oil reservoir 136).

The oil in the oil reservoir 136 can be cooled and subsequently dispensed from the oil reservoir 136 to cool the stator 116. For example, oil can be configured to pass through grooves 142a, 142b formed in an inner surface of housing 102. Oil can flow from these grooves 142a, 142b to at least one opening 144, 146 that is configured to disperse, spray, or otherwise dispense oil from the oil reservoir 136 to the stator 116. In one example, the at least one opening 144, 146 includes two openings that are axially spaced away from each other. The at least one opening 144, 146 can include a 360-degree opening in the stator carrier 118, in one example. In another example, the at least one opening 144, 146 can include a plurality of circumferentially spaced apart openings. Nozzles or other fluid dispensers can be implemented within the at least one opening 144, 146 to spray oil towards the stator 116. In one example, the oil is sprayed towards the stator windings 124. The at least one opening 144, 146 can have a tapered outlet profile to act as a spray nozzle or orifice. The at least one opening 144, 146 can include a first opening 144 axially aligned with a first portion of the stator windings 124, and a second opening 146 axially aligned with a second portion of the stator windings 124.

Water can be configured to be fed through an inlet 148 that is fluidly connected with an interior pocket 150 where it is cycled around the water jacket 138 to an outlet (shown schematically as outlet 149 in FIG. 4). The inlet 148 can be arranged to seal to both the water jacket 138 and the housing 102 to prohibit cross leakage or external leakage. One of ordinary skill in the art would understand that various seals, interfaces, plugs, etc., can be used to ensure that the water and oil flows are separated.

FIG. 4 further schematically shows a heat exchanger (HX) feature as being arranged in a region of the water jacket 138 and the oil reservoir 136. Accordingly, cool water that is cycled through the water jacket 138 is used to cool oil within the oil reservoir 136 prior to the oil being sprayed towards the stator 116 or stator windings 124.

As further shown in FIG. 4, a power inverter module (PIM) 210 can be provided that is connected to the stator 116. The PIM 210 can be configured to control the motor and monitor the motor temperature. A connection line (C) is provided between the PIM 210 and the stator 116.

A method of cooling a stator 116 for an e-motor assembly is also disclosed herein. The method can include arranging a water jacket 138 directly adjacent to an outer surface of the stator 116, wherein the water jacket 138 is configured to circulate water therein to cool the stator 116. The method can include arranging an oil reservoir 136 directly adjacent to an outer surface of the water jacket 138. The method can include spraying oil from the oil reservoir 136 towards the stator 116 to further cool the stator 116. In one example, oil from the oil reservoir 136 is configured to be sprayed via at least one opening 144, 146 formed in a stator carrier 118. The at least one opening 144, 146 can include a first opening 144 facing a first axial end of the stator 116, and a second opening 146 facing a second axial end of the stator 116. The oil from the oil reservoir 136 can generally be configured to spray stator windings 124 of the stator 116. The method can include supplying oil to the oil reservoir 136 via a pump 126 that is configured to be driven via an internal combustion engine 200. Various other method steps can be implemented for cooling the stator 116, as well as the oil within the oil reservoir 136 prior to spraying the stator 116 or stator windings 124.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS hybrid module 100
housing 102
module wall 104
e-motor 106
rotor carrier 108
flange 110
axially extending portion 112
rotor 114
stator 116
stator carrier 118
seal 120, 122
stator windings 124
pump 126
shaft 128
oil circuit 129
inlet flow channel 130
axially extending flow channel 132
radially extending flow channel 134
oil reservoir 136
water jacket 138
outer ring 140
groove 142a, 142b
at least one opening 144, 146
water jacket inlet 148
water jacket outlet 149
interior pocket 150
valve 160
fluid collection element 170
engine 200
power inverter module 210

What is claimed is:

1. A hybrid module comprising:
a housing;
a motor including a stator supported in the housing;
a water jacket surrounding at least a first portion of the stator; and
an oil reservoir arranged radially outwardly from the water jacket, the oil reservoir being configured to supply oil to at least one opening such that oil from the oil reservoir is sprayed towards the stator;
wherein the water jacket is configured to cool the stator and cool oil within the oil reservoir.

2. The hybrid module according to claim 1, further comprising an oil circuit that includes at least one pump.

3. The hybrid module according to claim 2, further comprising a fluid collection element configured to collect the oil after spraying the stator.

4. The hybrid module according to claim 3, wherein the at least one pump is configured to receive the oil from the fluid collection element.

5. The hybrid module according to claim 1,
wherein the housing includes an axially extending flow channel and a radially extending flow channel fluidly connected to a first end of the axially extending flow channel; and
a module wall arranged radially inward from the housing and including an inlet flow channel fluidly connected to a second end of the axially extending flow channel, wherein the oil is configured to be routed from the inlet flow channel in the module wall through the axially and radially extending flow channels in the housing to spray the stator.

6. The hybrid module according to claim 5, wherein the oil reservoir and the water jacket are coaxial with each other within the housing.

7. The hybrid module according to claim 1, further comprising a stator carrier, wherein the at least one opening is defined by the stator carrier.

8. The hybrid module according to claim 1, the housing includes at least one groove formed on an inner surface thereof, wherein the at least one groove defines a flow path for the oil to be supplied to the at least one opening.

9. The hybrid module according to claim 1, wherein the water jacket includes an interior pocket defined in radially outward direction by an outer ring, and defined in a radially inward direction by a stator carrier.

10. The hybrid module according to claim 9, wherein the outer ring defines a radially inner boundary of the oil reservoir.

11. The hybrid module according to claim 1, wherein the at least one opening is configured to be axially aligned with stator windings of the stator such that the oil is configured to spray the stator windings.

12. The hybrid module according to claim 1, wherein a majority of the water jacket and a majority of the oil reservoir overlap with each other.

13. A method of cooling a stator for a motor assembly, the method comprising:
providing a housing and a motor including a stator supported in the housing;
arranging a water jacket directly adjacent to an outer surface of the stator, wherein the water jacket is configured to circulate water therein to cool the stator;
arranging an oil reservoir directly adjacent to an outer surface of the water jacket such that oil within the oil reservoir is cooled via the water jacket; and
spraying oil from the oil reservoir towards the stator to further cool the stator.

14. The method according to claim 13, wherein the oil from the oil reservoir is configured to be sprayed via at least one opening formed in a stator carrier.

15. The method according to claim 14, wherein the at least one opening includes a first opening facing a first axial end of the stator and a second opening facing a second axial end of the stator.

16. The method according to claim 13, wherein the oil from the oil reservoir is configured to spray stator windings of the stator.

17. The method according to claim 13, further comprising supplying oil to the oil reservoir via a pump that is configured to be driven via an internal combustion engine.

18. A heat exchanger assembly comprising:
a water jacket configured to be in direct contact with a body of a stator, the water jacket including an outer ring defining a radially outer wall of the water jacket; and
an oil reservoir partially bound by the outer ring, the oil reservoir being configured to supply oil to at least one opening such that oil is sprayed towards stator windings, wherein the oil reservoir is fluidly connected to an oil circuit that is separate from an engine oil circuit.

19. The heat exchanger assembly according to claim 18, wherein the oil reservoir is configured to receive oil via at least one pump that is driven by an internal combustion engine.

20. The heat exchanger assembly according to claim 18, wherein a radially inner wall of the water jacket is defined by a stator carrier, and the stator carrier also defines the at least one opening.

* * * * *